(12) United States Patent
Robins

(10) Patent No.: US 8,677,727 B2
(45) Date of Patent: Mar. 25, 2014

(54) QUICK RELEASE FASTENING SYSTEM

(71) Applicant: Terry K. Robins, Minneapolis, KS (US)

(72) Inventor: Terry K. Robins, Minneapolis, KS (US)

( * ) Notice: Subject to any disclaimer, the term of this patent is extended or adjusted under 35 U.S.C. 154(b) by 0 days.

(21) Appl. No.: 13/626,461

(22) Filed: Sep. 25, 2012

(65) Prior Publication Data
US 2013/0074469 A1 Mar. 28, 2013

Related U.S. Application Data

(60) Provisional application No. 61/626,276, filed on Sep. 26, 2011.

(51) Int. Cl.
*F16G 13/06* (2006.01)
*F16G 15/04* (2006.01)

(52) U.S. Cl.
USPC .............. 59/86; 59/85; 403/325; 403/349

(58) Field of Classification Search
USPC .................... 59/85, 86; 403/325, 349
See application file for complete search history.

(56) References Cited

U.S. PATENT DOCUMENTS

| 125,744 | A | * | 4/1872 | Low .................................. 59/86 |
| 809,511 | A | * | 1/1906 | Lien .................................. 59/86 |
| 1,419,974 | A | * | 6/1922 | McLaughlin .................... 59/86 |
| 6,023,927 | A |  | 2/2000 | Epstein |
| 6,568,894 | B2 | * | 5/2003 | Golden et al. ................. 411/351 |
| 7,448,823 | B2 |  | 11/2008 | Silva |
| 7,540,140 | B1 | * | 6/2009 | Diaz et al. ........................ 59/86 |

FOREIGN PATENT DOCUMENTS

| JP | 2000055141 A | 2/2000 |
| KR | 1020080065781 A | 7/2008 |
| WO | 2005124073 A2 | 12/2005 |

OTHER PUBLICATIONS

PCT Patent Application PCT/US2012/057087 International Search Report and Written Opinion dated Feb. 28, 2013, 9 pages.

* cited by examiner

*Primary Examiner* — David B Jones
(74) *Attorney, Agent, or Firm* — Lathrop & Gage LLP

(57) ABSTRACT

Locking devices as well as methods of their manufacture and use are disclosed. One locking device includes first and second legs operatively coupled together to form a perimeter substantially uninterrupted from a proximal end of the first leg to a proximal end of the second leg. The proximal ends are separated by an opening, and each proximal end respectively defines a passage. A keyway extends from the first leg passage, and first and second shoulders are adjacent the keyway. A receiving area extends from the second leg passage. A locking pin passes through the second leg passage and is movable between an open position, a closed position, and an intermediate position. The locking pin has a key and a stop that prevent the locking pin from passing entirely through the second leg passage. A biasing member biases the locking pin in various ways.

17 Claims, 12 Drawing Sheets

QUICK RELEASE FASTENING SYSTEM

CROSS-REFERENCE TO RELATED APPLICATIONS

This application claims priority to U.S. Provisional Application No. 61/626,276 filed Sep. 26, 2011, the disclosure of which is incorporated herein by reference in its entirety.

FIELD OF THE INVENTION

The invention relates generally to the field of fastening systems. More specifically, the invention relates to the field of quick release fastening systems utilizing permanently fastened locking pins.

BACKGROUND OF THE INVENTION

Fastening systems such as shackles are commonly used in a variety of industries to secure two or more objects to each other. For example, construction workers may use a shackle to secure a heavy load to a crane. Tow truck drivers may utilize a shackle to secure a vehicle to a tow truck. Or sailors may use a shackle to fasten a ship to a dock. Typically, shackles have a U or C-shaped housing having two legs, each of which has an opening for the passage of a clevis or locking pin. Unsurprisingly, it is desirable for manufacturers of shackles to ensure that the locking pin does not completely separate from the housing; separated locking pins are prone to being misplaced, and a missing locking pin prevents the shackle from being used as desired. Complex mechanisms have been developed to ensure retention of the locking pin with the housing. For example, U.S. Pat. No. 6,023,927 to Epstein discloses a shackle having a U-shaped member, a locking lever having an outwardly projecting finger, and a clevis pin having two perpendicular grooves therein that allow for the passage of a clevis pin and prevent the clevis pin from separating from the U-shaped member. Drawbacks remain in prior art shackles, however (e.g., complications in manufacturing, difficulties in use, attention that must be paid not to clog relatively small openings in locking pins, etc.), and new quick release fastening systems that may overcome some of these and/or other deficiencies are desirable.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a locking device includes first and second legs operatively coupled to one another to form a perimeter substantially uninterrupted from a proximal end of the first leg to a proximal end of the second leg. The first leg proximal end and the second leg proximal end are separated by an opening, and the first leg proximal end and the second leg proximal end each respectively defining a passage. The first leg proximal end has a keyway extending from the first leg passage, and the first leg proximal end has first and second shoulders adjacent the keyway. The second leg proximal end has a receiving area extending from the second leg passage. A locking pin passes through the second leg passage. The locking pin has a key and a stop that prevent the locking pin from passing entirely through the second leg passage such that the locking pin is inseparable from the second leg proximal end. The locking pin has first and second ends, and the key is at the locking pin first end. The locking pin is movable between an open position wherein the opening is generally unobstructed and the key is seated in the receiving area, a closed position wherein the opening is obstructed by the locking pin and the key is seated against the first leg proximal end with the first and second shoulders preventing the key from reaching the keyway, and an intermediate position wherein the key extends beyond the first and second shoulders to access the keyway. A biasing member is included that biases the locking pin such that the key seats against the first leg proximal end when the locking pin is at the closed position, such that the key passes at least partially through the keyway when the locking pin is at the intermediate position and the key is aligned with the keyway, and such that the locking pin moves to the closed position when the locking pin is at the intermediate position and the key is aligned distinctly from the keyway and the first and second shoulders.

In another embodiment, a locking device includes first and second legs operatively coupled to one another to form a perimeter substantially uninterrupted from a proximal end of the first leg to a proximal end of the second leg. The first leg proximal end and the second leg proximal end are separated by an opening, and the first leg proximal end and the second leg proximal end each respectively define a passage along a common imaginary axis. The first leg proximal end has a first side relatively adjacent to the second leg and a second side relatively distant from the second leg. Moreover, the first leg proximal end has a keyway extending from the first leg passage, and the first leg proximal end has first and second shoulders adjacent the keyway at the second side. A locking pin passes through the second leg passage. The locking pin has a key and a stop that prevent the locking pin from passing entirely through the second leg passage such that the locking pin is inseparable from the second leg proximal end. The locking pin has first and second ends, and the key is at the locking pin first end. The locking pin is movable between an open position wherein the opening is at least partially unobstructed, a closed position wherein the opening is completely obstructed by the locking pin and the key is seated against the first leg proximal end with the first and second shoulders preventing the key from reaching the keyway, and an intermediate position wherein the key extends beyond the first and second shoulders to access the keyway. A biasing member is included that biases the locking pin such that the key seats against the first leg proximal end when the locking pin is at the closed position, such that the key passes at least partially through the keyway when the locking pin is at the intermediate position and the key is aligned with the keyway, and such that the locking pin moves to the closed position when the locking pin is at the intermediate position and the key is aligned distinctly from the keyway and the first and second shoulders.

BRIEF DESCRIPTION OF THE DRAWINGS

Illustrative embodiments of the present invention are described in detail below with reference to the attached drawing figures.

DETAILED DESCRIPTION

Figure 1:
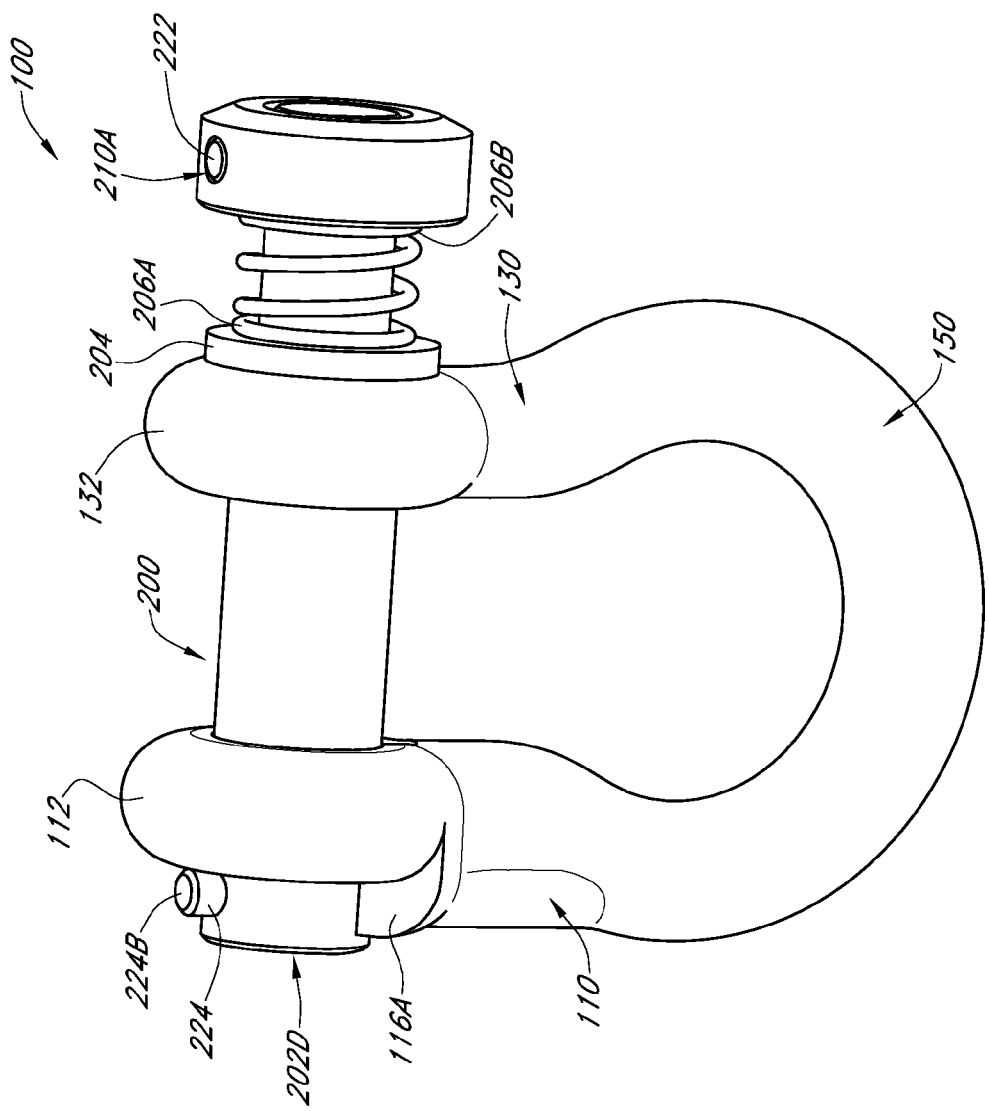
FIG. 1 is a front perspective view of a quick release fastener in a locked position in accordance with one embodiment of the current invention.

Embodiments of the present invention provide systems and methods for quickly and conveniently securing two or more objects to each other. FIG. 1 shows one embodiment 100 of a quick release fastener in accordance with the teachings of the current invention. As can be seen, the quick release fastener 100 has a first leg 110, a second leg 130, a connecting member 150, and a closure element (or "locking pin") 200.

The first leg 110 and the second leg 130 are connected to each other (e.g., at respective distal ends) by the connecting member 150. The legs 110, 130 and the connecting member 150 are shown in the drawings as collectively being C-shaped. People of skill in the art will appreciate however that the elements may be of other shapes so long as a substantially uninterrupted perimeter is formed from a proximal end of the first leg to a proximal end of the second leg (e.g., U-shaped). The connecting member 150 may be made of wrought iron, galvanized carbon steel, metal alloys, or other desirable materials that will allow the connecting member 150 to support heavy loads.

The first leg 110 may have an end piece 112 (e.g., at its proximal end) and the second leg 130 may have an end piece 132 (e.g., at its proximal end). The end piece 112 of the first leg 110 may be generally circular and have an opening (or "passage") 114 (see FIG. 2). The end piece 132 of the second leg 130 may similarly be generally circular and have an opening (or "passage") 134 (see FIG. 2). As discussed in more detail below, the opening 114 and the opening 134 may be configured for the passage of a rod 202 of the closure element 200. The first leg 110, the second leg 130, the end piece 112 of the first leg 110, the end piece 132 of the second leg 130, and the connecting member 150 may be of a unitary construction as shown. Or, for example, the legs 110, 130 may be constructed separately and secured to the connecting member 150 (e.g., via rivets or other fasteners, threading, et cetera). The first leg 110 (including the end piece 112) and the second leg 130 (including the end piece 132) may be made of the same materials as the connecting member 150, or may be constructed of different suitable materials.

Figure 2:
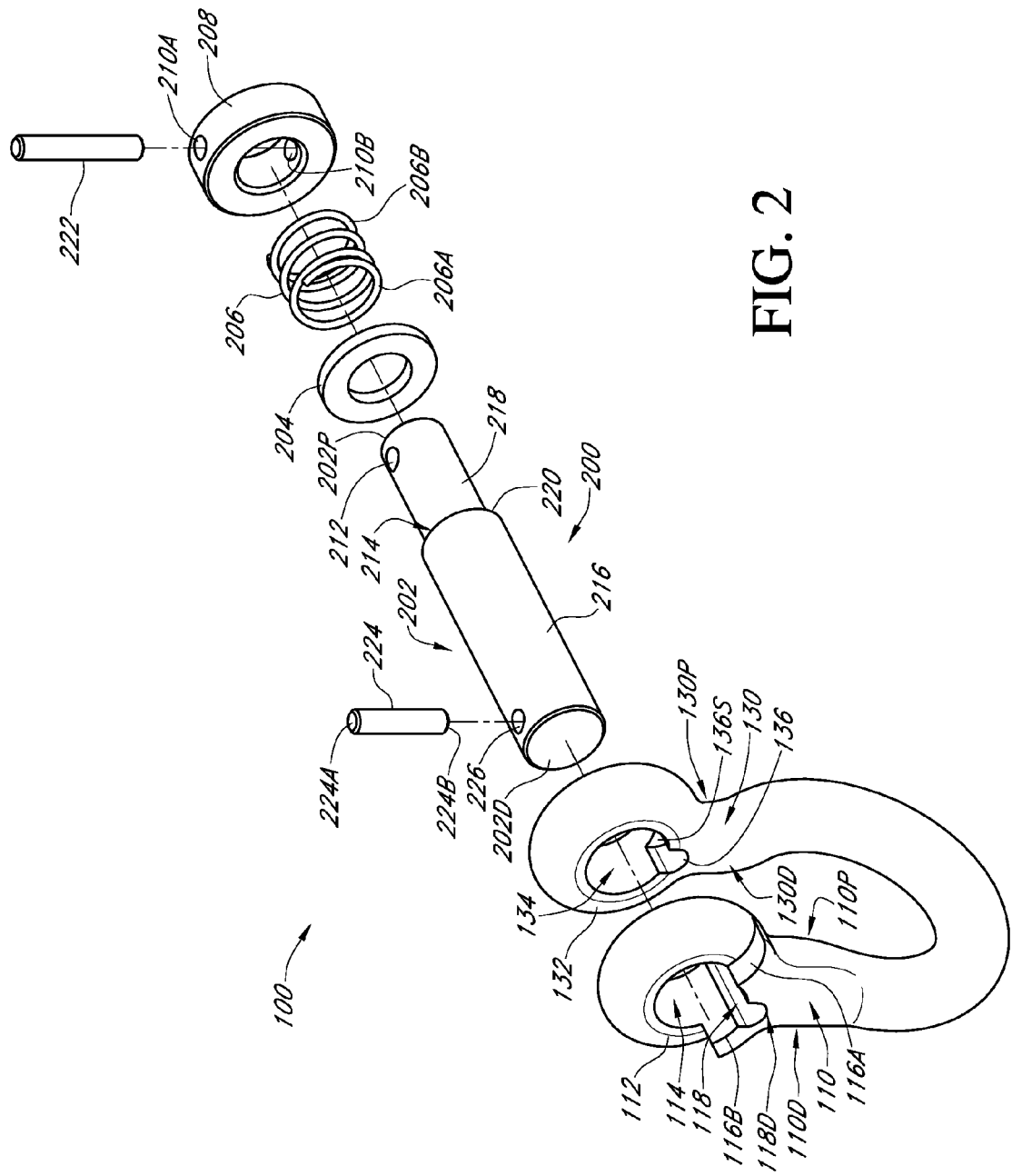
FIG. 2 is an exploded view of the quick release fastener of FIG. 1.
Figure 3:
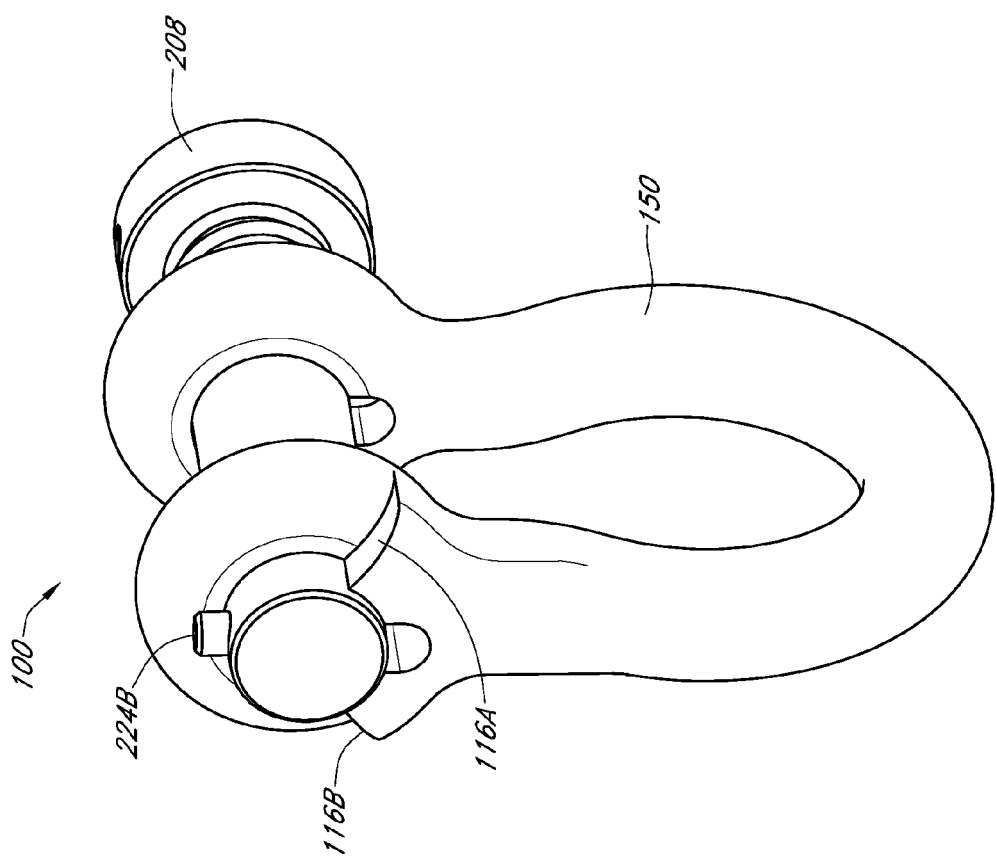
FIG. 3 is a side perspective view of the quick release fastener of FIG. 1, showing a key of a rotatable closure element facing away from a keyway in a first leg of a connecting member.

Attention is now directed to FIG. 2. The closure element 200 may have a proximal end 202P and a distal end 202D, and a push plate 204, a biasing member 206, and an end cap (or "stop") 208 may be included. The end cap 208 may be coupled to the rod 202 in various ways. For example, the end cap 208 may include two opposing openings 210A and 210B, the rod 202 may include an opening 212 at the proximal end 202P, and a locking member 222 (e.g., a cylindrical pin) may pass through the openings 210A, 212, 210B. The locking member 222 may be secured within the openings 210A, 212, 210B by a press fit, threading, adhesive, et cetera. It will be appreciated by those skilled in the art that other methods of securing the end cap 208 at the proximal end 202P may alternately be utilized. For example, the rod 202 may be externally threaded, and corresponding internal threadings may be provided in the end cap 208 for securement of the end cap 208 at the proximal end 202P.

The rod 202 may have a seating feature 214, and as discussed in more detail herein, the biasing member 206 may cause the push plate 204 to push against and rest adjacent the seating feature 214. In the figures, the seating feature 214 is shown as being effectuated by dividing the rod 202 into two portions 216 and 218, with the diameter of the portion 216 being greater than the diameter of the portion 218. As can be seen, the portion 216 may extend from the distal end 202D, and the portion 218 may extend from the proximal end 202P. The smaller diameter of the portion 218 may allow the biasing member 206 to push the push plate 204 and cause it to rest against a head 220 of the portion 216. People of skill in the art will appreciate from the disclosure herein that other methods may also be utilized to provide the functionality of the seating feature 214.

Once assembled, the embodiment 100 has the push plate 204 located at the seating feature 214, the end cap at the end 202P, and the biasing member 206 between the push plate 204 and the end cap 208. With the end cap 208, the push plate 204, and the biasing member 206 configured in this fashion, the biasing member 206 is retained over the rod 218 and may push against the push plate 204 and the end cap 208. The biasing member 206 may be, for example, a durable coil spring having a first end 206A and a second end 206B. As can be seen in FIG. 1, once configured between the push plate 204 and the end cap 208 as discussed above, the first end 206A of the biasing member 206 pushes against the push plate 204 and biases the push plate 204 to, in turn, push against the seating feature 214. The second end 206B of the biasing member 206, conversely, pushes against the end cap 208. In some embodiments, the end cap 208 is configured to be conveniently removable from the rod 202, so that the biasing member 206 may be replaced with another biasing member 206 (e.g., if the tensile strength of the biasing member 206 is diminished after repeated use).

The first leg 110 may have a distal side 110D (which faces away from the second leg 130) and a proximal side 110P (which faces towards the second leg 130). Stops (or "shoulders") 116A and 116b may be formed at the distal side 110D of the first leg 110. A distal end 118D of a keyway 118 (or "groove") may originate between the stops 116A and 116B, and the keyway 118 may extend all the way from the distal side 110D of the first leg 110 to its proximal side 110P. The keyway 118 may terminate at a proximal end 118P at the proximal side 110P of the first leg 110, and it will be appreciated that the proximal end 118P of the keyway 118 may be generally identical to its distal end 118D. The keyway 118 may be configured for the passage of a key 224, as discussed in more detail below.

The second leg 130 may have a distal side 130D (facing towards the first leg 110) and a proximal side 130P (facing away from the first leg 110). A key receiver 136 which faces the proximal side 110P of the first leg 110 may be formed within the distal side 130D of the second leg 110. Unlike the keyway 118 which extends all the way from the distal side 110D of the first leg 110 to its proximal side 110P, the key receiver 136 may include a stop 136S and terminate between the distal side 130D and the proximal side 130P of the second leg 130.

The distal end 202D of the locking pin 200 may be brought adjacent the proximal side 130P of the second leg 130 and passed through the opening 134 in the end piece 132 of the second leg 130 such that the distal end 202D of the rod 202 is between the first leg 110 and the second leg 130. The rod 202 may include an opening 226 (see FIG. 8) at distal end 202D, and the opening 226 may be configured for the passage of the key 224, which may have a flush end 224A and a protruding end 224B. More specifically, the key 224 may be received in the opening 226 such that the flush end 224A does not protrude from the rod 202, and such that the protruding end 224B extends beyond the rod 202. The key 224 may be permanently fastened to the rod 202 in this fashion by using, for example, threading, adhesive or other suitable methods.

Figure 11:
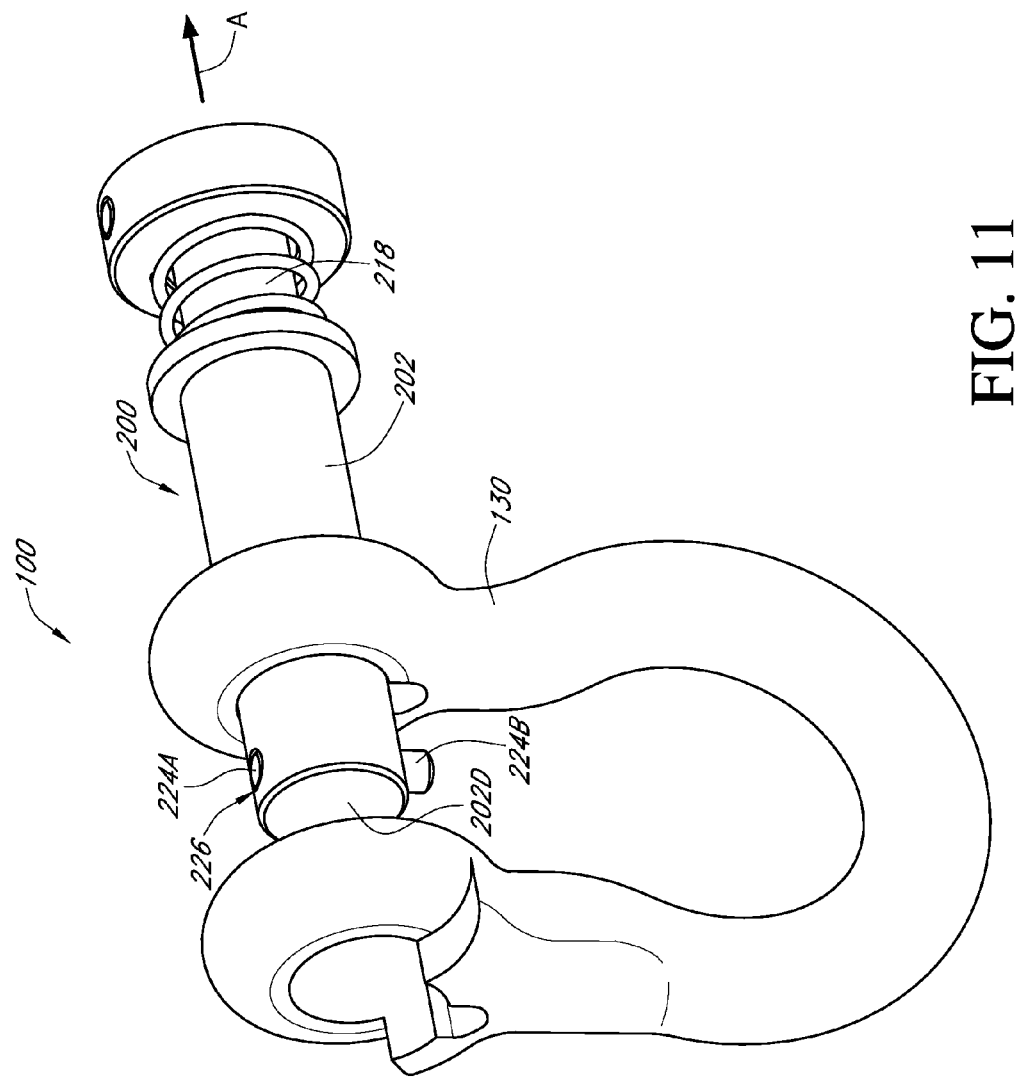
FIG. 11 is a front perspective view of the quick release fastener of FIG. 1 showing the rotatable closure element sliding towards a second leg of the connecting member.

FIG. 11, for example, shows the quick release fastener 100 fully assembled. It will be appreciated by those skilled in the art that the quick release fastener 100 may be assembled by various methods and in various orders and steps, and that various elements (e.g., the key 224 and the rod 202) may be formed (e.g., cast or milled) from a single piece of material.

When the distal end 202D of the locking pin 200 is at any point between the end piece 112 of the first leg 110 and the end piece 132 of the second leg 130 (as shown in FIG. 11, for example), the locking pin 200 may be freely rotated. More specifically, the locking pin 200 may be rotated by rotating the end cap 208, which as outlined above, may be secured to the rod 202 at the proximal end 202P by the locking member 222. As will be appreciated, the protruding end 224B of the key 224 may be selectively moved to face the attachment member 150, or for example, face away from the attachment member 150 by rotation of the locking pin 200.

Figure 12:
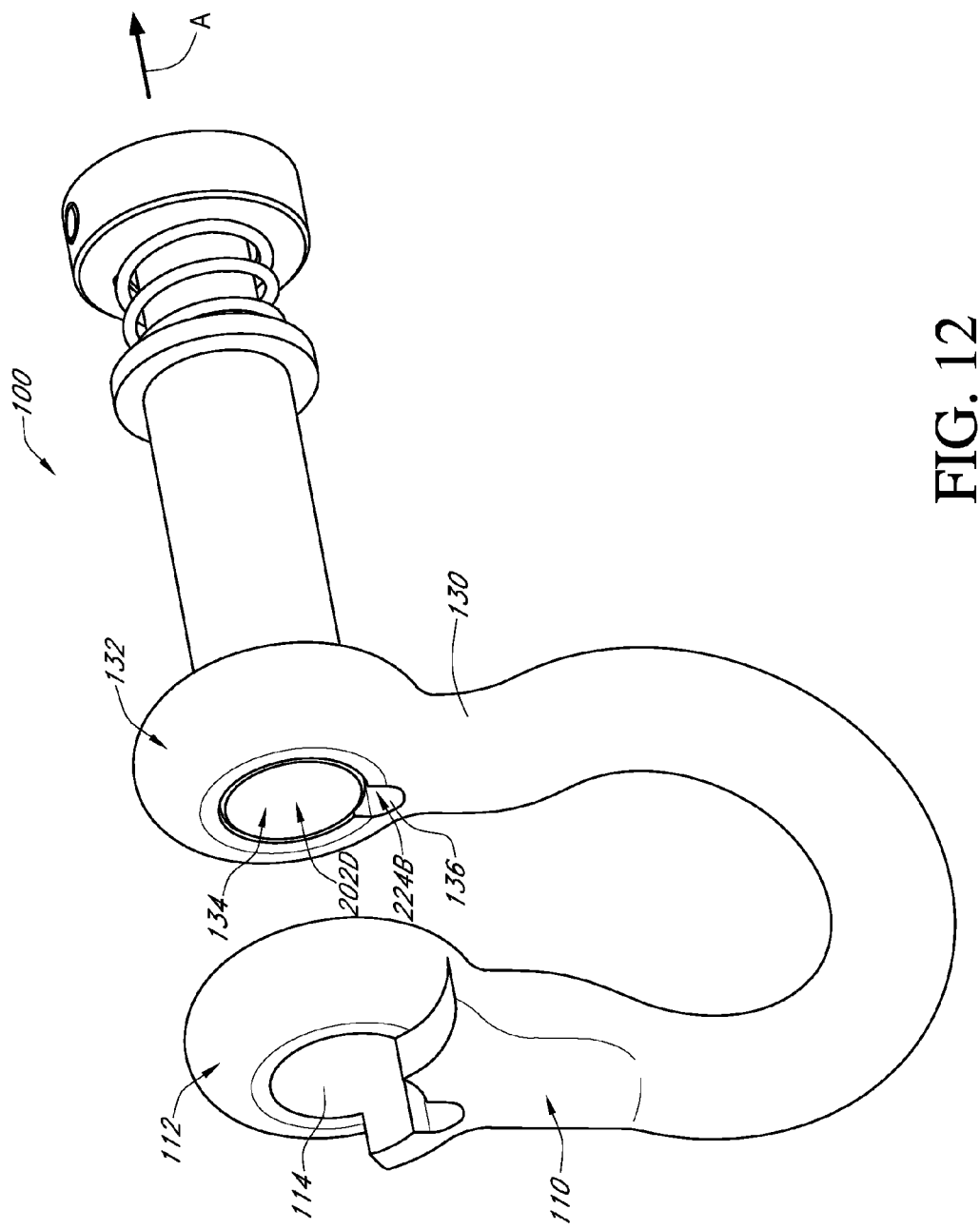
FIG. 12 is a front perspective view of the quick release fastener of FIG. 1 with the key in a key receiver of the second leg.

The locking pin 200 may also be moved laterally by pushing and pulling the end cap 208 towards and away from the second leg 130 respectively. FIG. 12 shows the extent to which the distal end 202D can be laterally moved away from the end piece 112 of the second leg 110. Specifically, as the locking pin 200 is pulled laterally in the direction A (see FIG. 12), the protruding end 224B of the key 224 enters the key receiver 136 and abuts against the stop 136S (see FIG. 2), preventing further lateral movement of the locking pin 200 in direction A. As can be seen in FIG. 12, in this unlocked (or "open") position, the distal end 202D of the locking pin 200 does not protrude from the opening 134, ensuring that the locking pin 200 does not interfere with an object that is to be secured by the quick release fastener 100.

Figure 8:
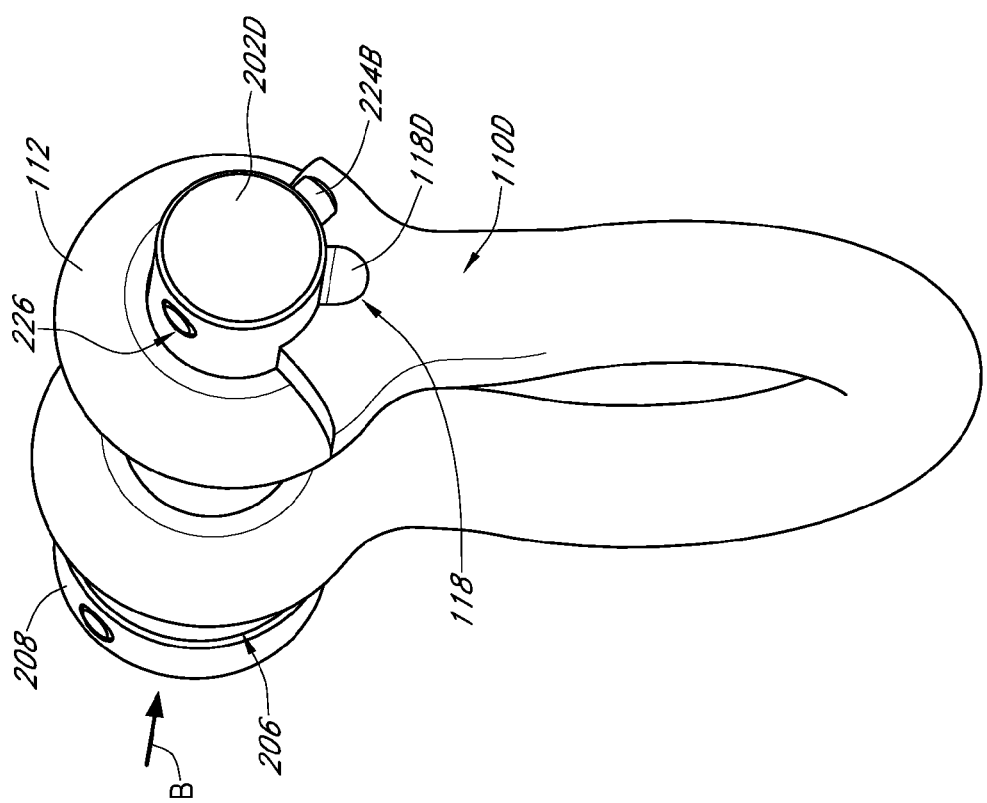
FIG. 8 is a side perspective view of the quick release fastener of FIG. 1 with the biasing member in the compressed position.
Figure 9:
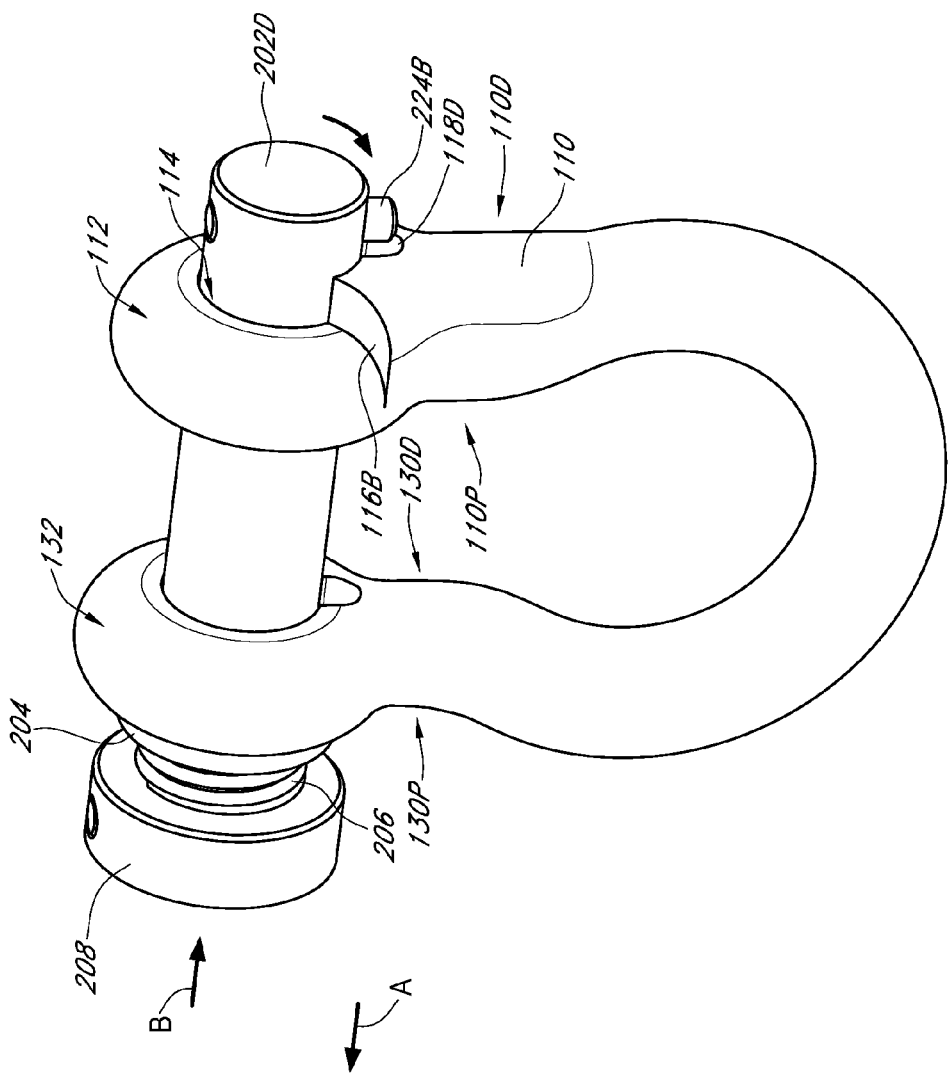
FIG. 9 is a rear perspective view of the quick release fastener of FIG. 1 with the biasing member in the compressed position and the key aligned with the keyway.
Figure 10:
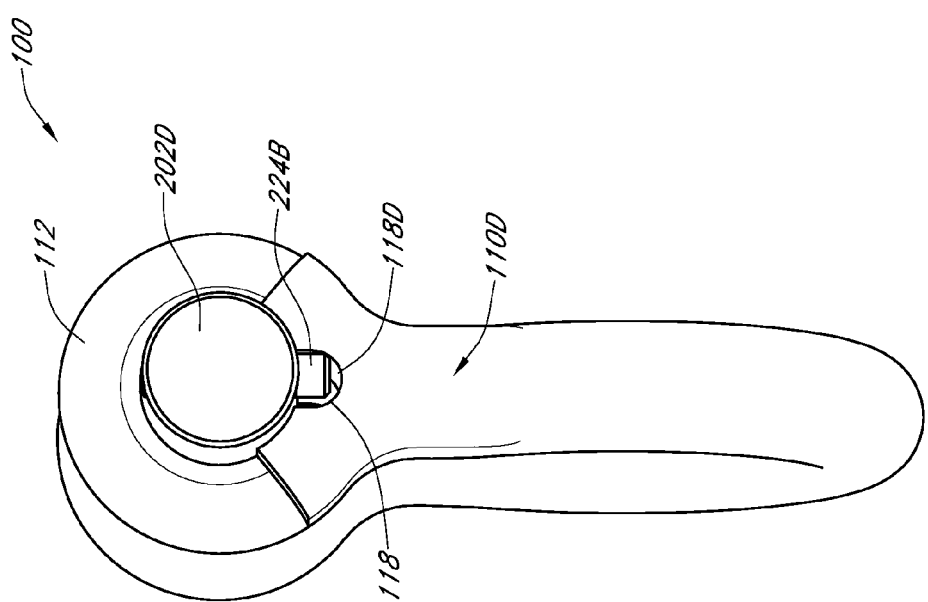
FIG. 10 is a side perspective view of the quick release fastener of FIG. 1 with the biasing member in the compressed position and the key within the keyway.

Attention is now directed to FIG. 9, which shows the extent to which the distal end 202D of the locking pin 200 can be laterally moved past the opening 114 in the end piece 112 of the first leg 110. Specifically, as the end cap 208 is pushed towards the second leg 130 in direction B, the push plate 204 abuts against the proximal side 130P of the second leg 130 (and specifically, against the end piece 132 of the second leg 130) and the protruding end 224B of the key 224 moves past the proximal end 118P of the keyway 118 and becomes aligned with the distal end 118D of the keyway 118 (see FIG. 10). As the end cap 208 is moved further in direction B to the intermediate position of FIG. 9, the biasing member 206 is compressed between the push plate 204 (which is abutting against the end piece 132) and the end cap 208, causing the protruding end 224B of the key 224 to laterally move beyond the distal end 118D of the keyway 118. If the force being applied to the end cap 208 to push the rod 202 in direction B is eliminated, it will be appreciated that the biasing member 206 will decompress and cause the protruding end 224B of the key 224 to once again enter the keyway 118 (see FIG. 10). If, on the other hand, the end cap 208 is rotated as shown in FIG. 8 while the biasing member 206 is compressed and after the protruding end 224B of the key 224 has advanced in direction B beyond the distal end 118D of the keyway 118 (i.e., while at the intermediate position), then after the force being applied to the end cap 208 is eliminated, the biasing member 206 may decompress and cause the protruding end 224B of the key 224 to abut against the distal side 110D of the first leg (and more specifically, the end piece 112 or the stops 116A, 116B). Further lateral movement of the distal side 202D of the rod 202 towards the second leg 130 will therefore be prevented (unless the rod 202 is rotated by rotating the end cap 208, as discussed below).

Figure 4:
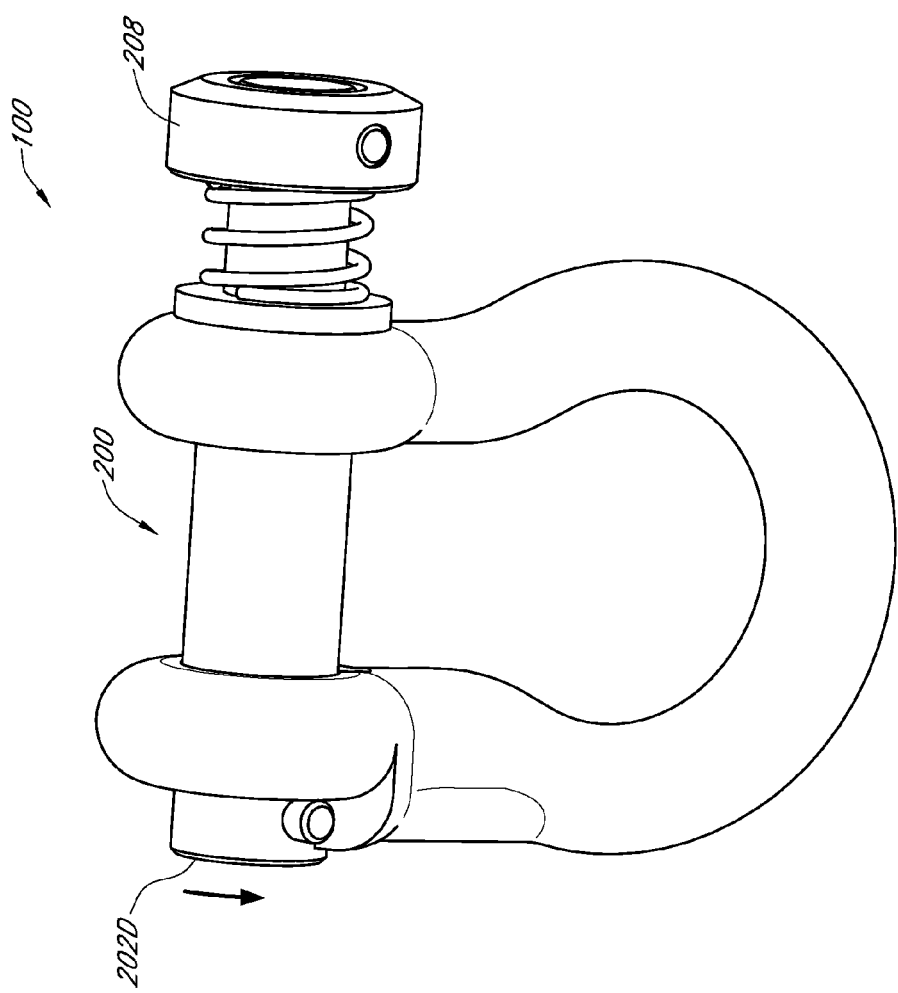
FIG. 4 is a front perspective view of the quick release fastener of FIG. 1 with the key of the rotatable closure element abutting against a stop in the first leg of the connecting member.
Figure 5:
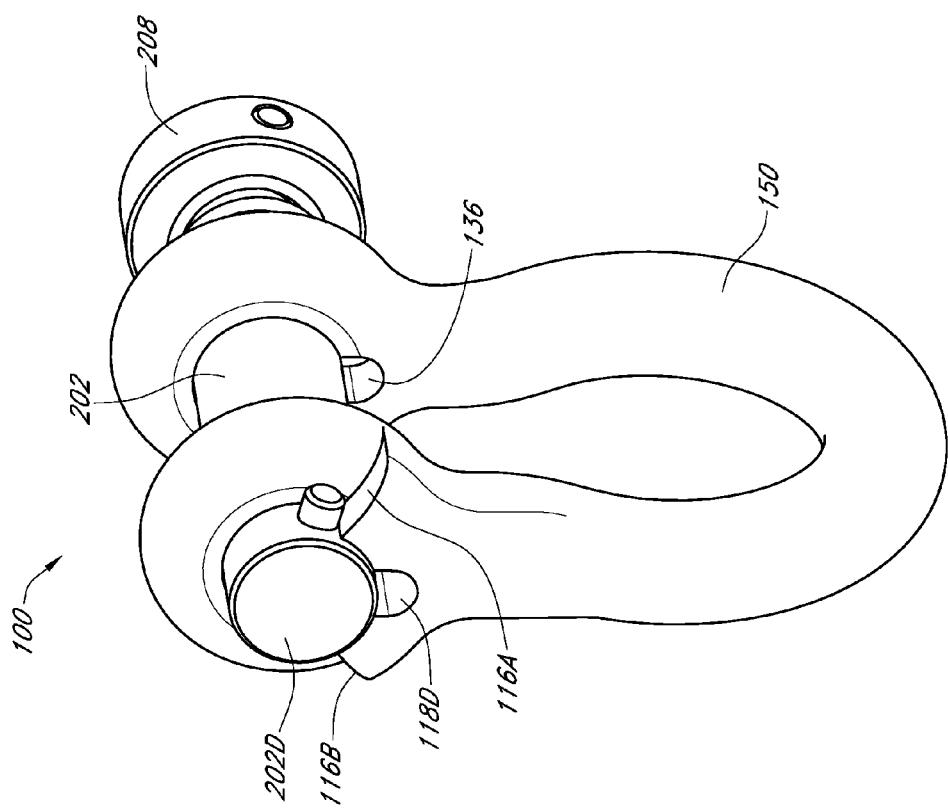
FIG. 5 is a side perspective view of the quick release fastener of FIG. 1 with the key of the rotatable closure element abutting against the stop.

While the distal side 202D of the locking pin 200 as shown in FIG. 8 cannot be laterally moved towards the second leg 130 because of the abutting of the protruding end 224B of the key 224 against the distal side 110D of the first leg 110, it will be appreciated that such lateral movement will occur if the end cap 208 (or rod 202) is rotated such that the protruding end 224B of the key 224 becomes adjacent the distal end 118D of the keyway 118. To prevent such lateral movement of the rod 202 unintentionally by rotation of the end cap 208, the end cap 208 may be rotated such that the protruding end 224B of the key 224 faces away from the connecting member 150 (see FIG. 1) and abuts against the end piece 112. Once the protruding end 224B of the key 224 abuts against the end piece 112 as shown in FIG. 1, the rod 202 may no longer be laterally displaced unintentionally through rotation. More specifically, if the end cap 208 is now rotated, the protruding end 224B of the key 224 will abut against the stops 116A or 116B (see FIGS. 2, 4, and 5), preventing the protruding end 224B of the key 224 from becoming adjacent the keyway 118. The locking pin 200 will accordingly be firmly secured in a locked (or "closed") position.

In some embodiments, when the locking pin 200 is in the locked position (as in FIG. 1, for example), it may be desirable for the protruding end 224B of the key 224 to be rotatable by at least ninety degrees relative to the first leg 110 and the second leg 130. In some embodiments, it may further be desirable for the protruding end 224B of the key 224 to be rotatable by at least one hundred and eighty degrees relative to the first leg 110 and the second leg 130.

Figure 6:
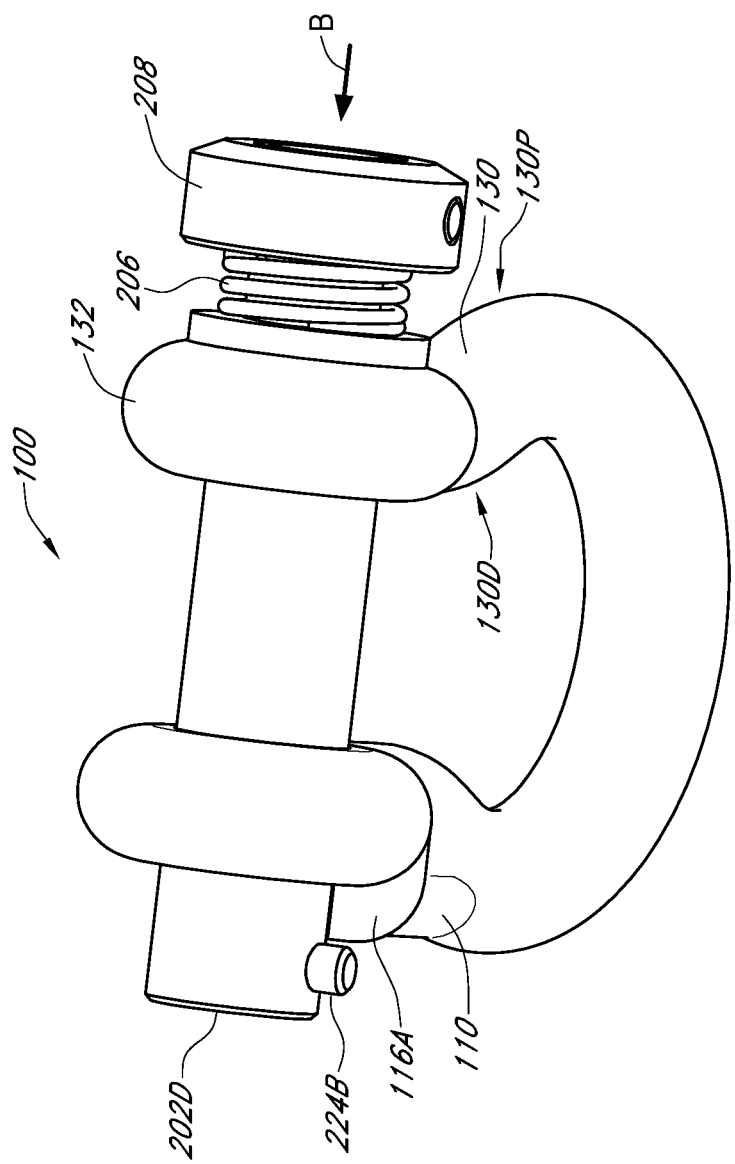
FIG. 6 is a top perspective view of the quick release fastener of FIG. 1 showing a biasing member of the rotatable closure element in a compressed position.
Figure 7:
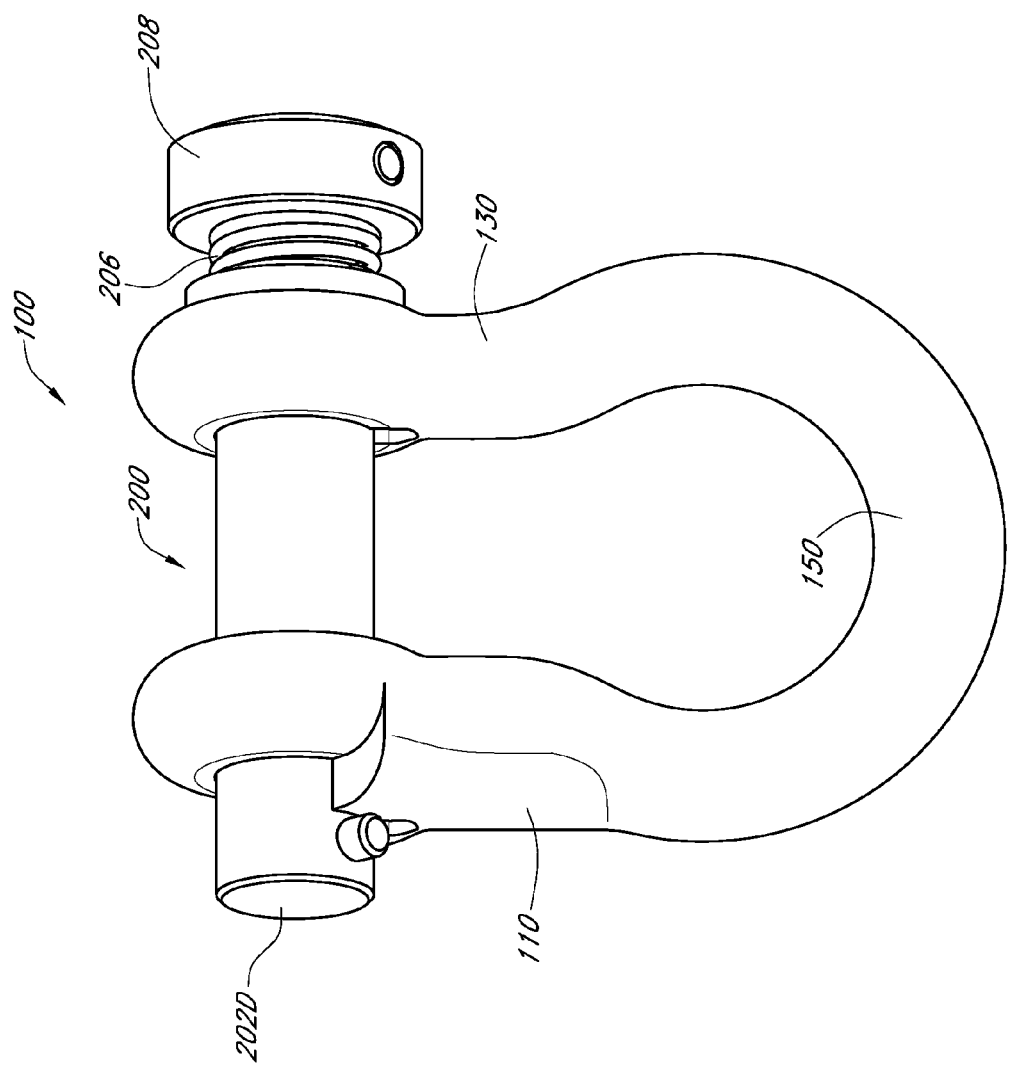
FIG. 7 is a front perspective view of the quick release fastener of FIG. 1 illustrating rotation of the rotatable closure element while the biasing member is in a compressed position.

Unlocking of the fastener 100 may be effectuated conveniently. Specifically, to unlock the fastener 100, the end cap 208 may first be pushed in direction B as shown in FIG. 6, which may cause the biasing member 206 to compress and the protruding end 224B to extend in direction B beyond the stops 116A, 116B (i.e., causing the locking pin 200 to reach the intermediate position). While the protruding end 224B is extending in direction B beyond the stops 116A, 116B, the end cap 208 may be rotated until the protruding end 224B of the key 224 becomes aligned with the distal end 118D of the keyway (see FIG. 9). The end cap may then be pulled in direction A (FIG. 11), until the protruding end 224B of the key 224 is received by the key receiver 136 (FIG. 12).

Thus, as described herein, the quick release fastener 100 may, by a handful of movements, be put in a locked position from an unlocked position and vice versa. Indeed, the locking and unlocking of the quick release fastener 100 may be effectuated by one hand within a matter of seconds, allowing for significant added flexibility for the user.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

What is claimed is:

1. A locking device, comprising:
   first and second legs operatively coupled to one another to form a perimeter substantially uninterrupted from a proximal end of the first leg to a proximal end of the second leg, the first leg proximal end and the second leg proximal end being separated by an opening, the first leg proximal end and the second leg proximal end each respectively defining a passage, the first leg proximal end having a keyway extending from the first leg passage, the first leg proximal end having first and second shoulders adjacent the keyway, the second leg proximal end having a receiving area extending from the second leg passage;
   a locking pin passing through the second leg passage; the locking pin having a key and a stop that prevent the locking pin from passing entirely through the second leg passage such that the locking pin is inseparable from the second leg proximal end; the locking pin having first and second ends; the key being at the locking pin first end; the locking pin being movable between an open position wherein the opening is generally unobstructed and the key is seated in the receiving area, a closed position wherein the opening is obstructed by the locking pin and the key is seated against the first leg proximal end with the first and second shoulders preventing the key from reaching the keyway, and an intermediate position wherein the key extends beyond the first and second shoulders to access the keyway;
   a biasing member that biases the locking pin such that the key seats against the first leg proximal end when the locking pin is at the closed position, such that the key passes at least partially through the keyway when the locking pin is at the intermediate position and the key is aligned with the keyway, and such that the locking pin moves to the closed position when the locking pin is at the intermediate position and the key is aligned distinctly from the keyway and the first and second shoulders;
   wherein:
      the stop is at the locking pin second end;
      the locking pin has a first segment extending from the locking pin first end and a second segment extending from the locking pin second end;
      the first segment has a diameter that is larger than a diameter of the second segment;
      a push plate is movable over the second segment and restricted from moving above the first segment; and
      the biasing member extends between the stop and the push plate.

2. The locking device of claim 1, wherein the key is formed separately from and coupled to the first segment.

3. The locking device of claim 2, wherein the stop is formed separately from and coupled to the second segment.

4. The locking device of claim 3, wherein the locking pin is rotatable at least ninety degrees relative to the first and second legs when at the closed position.

5. The locking device of claim 3, wherein the locking pin is rotatable at least one hundred and eighty degrees relative to the first and second legs when at the closed position.

6. The locking device of claim 1, wherein the stop is formed separately from and coupled to the second segment.

7. The locking device of claim 1, wherein the locking pin is rotatable at least ninety degrees relative to the first and second legs when at the closed position.

8. The locking device of claim 1, wherein the locking pin is rotatable at least one hundred and eighty degrees relative to the first and second legs when at the closed position.

9. A locking device, comprising:
   first and second legs operatively coupled to one another to form a perimeter substantially uninterrupted from a proximal end of the first leg to a proximal end of the second leg, the first leg proximal end and the second leg proximal end being separated by an opening, the first leg proximal end and the second leg proximal end each respectively defining a passage along a common imaginary axis, the first leg proximal end having a first side relatively adjacent to the second leg and a second side relatively distant from the second leg, the first leg proximal end having a keyway extending from the first leg passage, the first leg proximal end having first and second shoulders adjacent the keyway at the second side;
   a locking pin passing through the second leg passage; the locking pin having a key and a stop that prevent the locking pin from passing entirely through the second leg passage such that the locking pin is inseparable from the second leg proximal end; the locking pin having first and second ends; the key being at the locking pin first end; the locking pin being movable between an open position wherein the opening is at least partially unobstructed, a closed position wherein the opening is completely obstructed by the locking pin and the key is seated against the first leg proximal end with the first and second shoulders preventing the key from reaching the keyway, and an intermediate position wherein the key extends beyond the first and second shoulders to access the keyway;
   a biasing member that biases the locking pin such that the key seats against the first leg proximal end when the locking pin is at the closed position, such that the key passes at least partially through the keyway when the locking pin is at the intermediate position and the key is aligned with the keyway, and such that the locking pin moves to the closed position when the locking pin is at the intermediate position and the key is aligned distinctly from the keyway and the first and second shoulders;
   wherein:
      the stop is at the locking pin second end;

the locking pin has a first segment extending from the locking pin first end and a second segment extending from the locking pin second end;

the first segment has a diameter that is larger than a diameter of the second segment;

a push plate is movable over the second segment and restricted from moving above the first segment; and the biasing member extends between the stop and the push plate.

10. The locking device of claim 9, wherein the key is formed separately from and coupled to the first segment.

11. The locking device of claim 10, wherein the stop is formed separately from and coupled to the second segment.

12. The locking device of claim 11, wherein the locking pin is rotatable at least ninety degrees relative to the first and second legs when at the closed position.

13. The locking device of claim 11 wherein the locking pin is rotatable at least one hundred and eighty degrees relative to the first and second legs when at the closed position.

14. The locking device of claim 11, wherein the stop is coupled to the second segment with a locking member.

15. The locking device of claim 14, wherein the locking member is a cylindrical pin.

16. The locking device of claim 9, wherein the opening is completely unobstructed when the locking pin is in the open position.

17. The locking device of claim 9, wherein the biasing member is a coiled spring.

* * * * *